US012674936B2

(12) United States Patent
Wang et al.

(10) Patent No.: US 12,674,936 B2
(45) Date of Patent: Jul. 7, 2026

(54) WAVELENGTH-DIVISION MULTIPLEXING DEVICE AND COMMUNICATIONS DEVICE

(71) Applicant: HUAWEI TECHNOLOGIES CO., LTD., Shenzhen (CN)

(72) Inventors: Qiang Wang, Shenzhen (CN); Wenjie Zhuang, Dongguan (CN); Xiaolei Li, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 371 days.

(21) Appl. No.: 18/481,335

(22) Filed: Oct. 5, 2023

(65) Prior Publication Data

US 2024/0027688 A1     Jan. 25, 2024

Related U.S. Application Data

(63) Continuation of application No. PCT/CN2022/082813, filed on Mar. 24, 2022.

(30) Foreign Application Priority Data

Apr. 9, 2021    (CN) ......................... 202110382327.X

(51) Int. Cl.
G02B 6/293        (2006.01)
G02B 6/32         (2006.01)
H04J 14/02        (2006.01)

(52) U.S. Cl.
CPC ....... G02B 6/2938 (2013.01); G02B 6/29365 (2013.01); G02B 6/32 (2013.01); H04J 14/02 (2013.01)

(58) Field of Classification Search
CPC .... G02B 6/29365; G02B 6/2938; G02B 6/32; H04J 14/02
See application file for complete search history.

(56) References Cited

U.S. PATENT DOCUMENTS 5,583,683 A       12/1996   Scobey
6,301,407 B1 *    10/2001   Donaldson ......... G02B 6/29365
                                                            385/24

(Continued)

FOREIGN PATENT DOCUMENTS

CN          2523121 Y  * 11/2002   ............. H04B 10/12
CN          103487890 A    1/2014

(Continued)

OTHER PUBLICATIONS

English Translation of CN-2523121-Y, 6 pages. (Year: 2002).*
International Search Report dated May 26, 2022, issued for International Application No. PCT/CN2022/082813 (10 pages).

*Primary Examiner* — Daniel Petkovsek

(57)                    ABSTRACT

A wavelength-division multiplexing device or a communications device may include a fastener, optical fibers, a filter, and a lens. The fastener is provided with an optical fiber positioning hole and a filter mounting groove, the filter mounting groove is disposed on a side of a tail end that is of the optical fiber positioning hole and that is away from an opening of the optical fiber positioning hole, and the filter mounting groove and the tail end of the optical fiber positioning hole are spaced apart. The optical fiber may be installed in the optical fiber positioning hole, the filter may be installed in the filter mounting groove, and the filter may transmissively transmit or reflect light rays emitted from the optical fiber.

18 Claims, 6 Drawing Sheets

(56)     References Cited

U.S. PATENT DOCUMENTS

| | | | | |
|---|---|---|---|---|
| 6,454,465 | B1 * | 9/2002 | Uschitsky | G02B 6/29364 |
| | | | | 385/47 |
| 6,767,139 | B2 | 7/2004 | Brun et al. | |
| 7,058,257 | B2 * | 6/2006 | Pan | G02B 6/2938 |
| | | | | 398/79 |
| 10,187,175 | B2 * | 1/2019 | Iwasaki | H04B 10/506 |
| 2002/0057868 | A1 * | 5/2002 | Wu | H04J 14/0213 |
| | | | | 385/24 |
| 2003/0099434 | A1 * | 5/2003 | Liu | G02B 6/2938 |
| | | | | 385/24 |

FOREIGN PATENT DOCUMENTS

| | | | | |
|---|---|---|---|---|
| CN | 105739022 | A | 7/2016 | |
| CN | 105974522 | A | 9/2016 | |
| CN | 108732686 | A | 11/2018 | |
| CN | 113495323 | A * | 10/2021 | G02B 6/29395 |

* cited by examiner

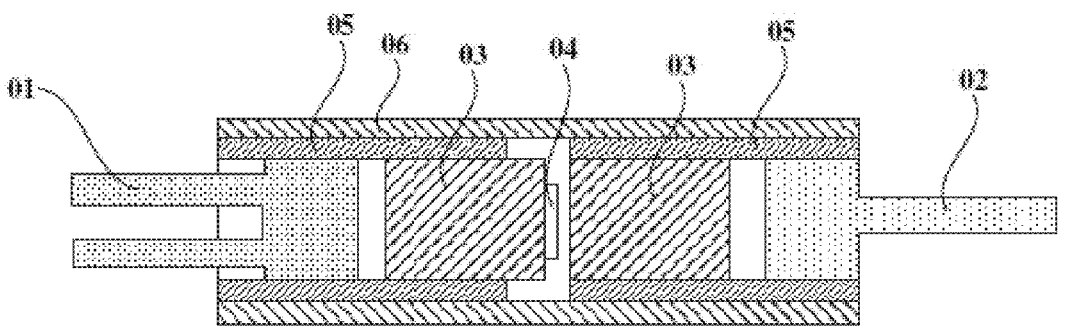
FIG. 1a
Conventional Art
λ1, λ2, ..., λn
λ1      λ2      ...      λn
FIG. 1b
Conventional Art
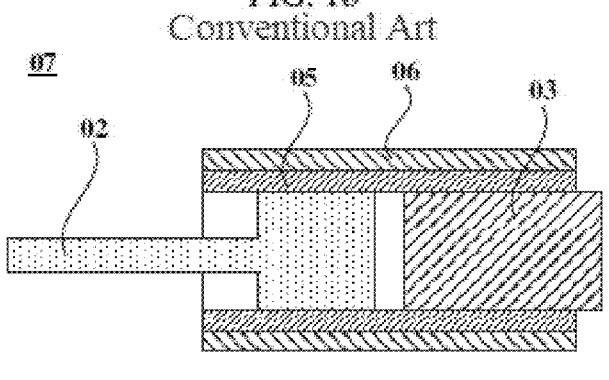
FIG. 2a
Conventional Art

WAVELENGTH-DIVISION MULTIPLEXING DEVICE AND COMMUNICATIONS DEVICE

CROSS-REFERENCE TO RELATED APPLICATIONS

This application continuation of International Application No. PCT/CN2022/082813, filed on Mar. 24, 2022, which claims priority to Chinese Patent Application No. 202110382327.X, filed on Apr. 9, 2021. The disclosures of the aforementioned applications are hereby incorporated by reference in their entireties.

TECHNICAL FIELD

This disclosure relates to the field of communications technologies, and in particular, to a wavelength-division multiplexing device and a communications device.

BACKGROUND

Standing out of optical communications, the fiber optic communications technology has become one of major pillars for modern communications, and is significant in modern telecommunications networks. As an emerging technology, the optical fiber communications technology has been developing rapidly and has been applied widely in recent years, which is rare in the history of communications. It is also an important symbol of the world's new technology revolution and a major information transmission tool in future information society.

An advantage of optical fiber communications is that optical fiber communications can convey light rays with dozens of wavelengths in a single optical fiber at the same time. This is referred to as wavelength-division multiplexing (WDM). A basic element for WDM transmission is an optical filter. Optical filters may be classified into, for example, an optical fiber fused taper type, a thin-film filter type, and an arrayed waveguide grating type. WDM devices of a thin film filter type are quite common.

Currently, for WDM devices of a thin film filter type, there is mainly a three-port cascading solution and a compact wavelength-division multiplexing solution. However, for WDM devices using the two solutions, active adjustment and assembly need to be performed between an optical fiber and a lens, and between two optical fibers; and an assembly process is relatively complex.

SUMMARY

This disclosure provides a wavelength-division multiplexing device and a communications device, to improve assembly efficiency of the wavelength-division multiplexing device and simplify a structure of a communications device.

According to a first aspect, a wavelength-division multiplexing device is provided. The wavelength-division multiplexing device may include a fastener, optical fibers, a filter, and a lens. The fastener is provided with an optical fiber positioning hole and a filter mounting groove, the filter mounting groove is disposed on a side of a tail end that is of the optical fiber positioning hole and that is away from an opening of the optical fiber positioning hole, and the filter mounting groove and the tail end of the optical fiber positioning hole are spaced apart. The optical fiber may be installed in the optical fiber positioning hole, the filter may be installed in the filter mounting groove, and the filter may be configured to transmissively transmit or reflect light rays emitted by the optical fiber. In addition, the lens disposed between the optical fiber and the filter may be configured to: collimate the light rays emitted by the optical fiber, or converge collimated light rays and then input the converged light rays into the optical fiber. In the wavelength-division multiplexing device provided in this disclosure, passive alignment between the optical fiber and the filter may be implemented by disposing the optical fiber positioning hole and the filter mounting groove in alignment, thereby effectively improving assembly efficiency of the wavelength-division multiplexing device.

To implement positioning of the optical fiber on the fastener, in a possible implementation of this disclosure, a positioning step may be disposed at the tail end of the optical fiber positioning hole. In this way, after the optical fiber is installed in the optical fiber positioning hole, the optical fiber is capable of abutting against the positioning step, and the positioning step can limit a depth at which a light ray extends into the fastener.

For specific disposition of the lens, the lens and the fastener may be an integral structure. In specific implementation, the fastener may be provided with a lens hole connected to the optical fiber positioning hole. The lens hole is disposed at the tail end of the optical fiber positioning hole, and the positioning step is formed between the lens hole and the optical fiber positioning hole.

In addition, an end that is of the lens hole and that is away from the optical fiber positioning hole has an arc-shaped surface. In this way, on a same optical path, a lens may be formed between the arc-shaped surface and a groove wall of the filter mounting groove, and the lens may be a spherical lens or an aspheric lens. It may be understood that the lens is a physical structure. Therefore, the lens has a physical structure between the arc-shaped surface and the groove wall of the filter mounting groove.

In a possible implementation of this disclosure, a plurality of optical fiber positioning holes and a plurality of filter mounting grooves may be disposed on the fastener. A difference between a quantity of the plurality of optical fiber positioning holes and a quantity of the plurality of filter mounting grooves is 1. One optical fiber is installed in each optical fiber positioning hole, and one filter is installed in each filter mounting groove. In this implementation, the wavelength-division multiplexing device may be provided with only one fastener. Functions of the wavelength-division multiplexing device may be implemented by installing a plurality of optical fibers and filters on the fastener. This can effectively simplify a structure of the wavelength-division multiplexing device.

A hollow area may be disposed on the fastener, and the plurality of filter mounting grooves may be disposed on two opposite side walls of the hollow area. In this way, a structure design of the filter mounting groove may be simplified, a weight of the fastener may be reduced, and a material may be reduced.

Generally, for use of the wavelength-division multiplexing device, an optical fiber on the fastener may be used as a common end, and light rays with different wavelengths may be input to the wavelength-division multiplexing device by using the common end, or may be emitted from the wavelength-division multiplexing device. In addition, another optical fiber except the common end may be used as a transmissive end of the wavelength-division multiplexing device, where the transmissive end may be configured to convey a light ray with a single wavelength. During specific application, light rays with different wavelengths entering the wavelength-division multiplexing device through the common end may be separated and then emitted through corresponding transmissive ends; or light rays with a single wavelength may enter the wavelength-division multiplexing device through corresponding transmissive ends and then are emitted through the common end after being converged.

It may be understood that, in this disclosure, the filters may be disposed in a one-to-one correspondence with the transmissive ends, so that a light ray with a single wavelength can be conveyed between the transmissive end and the filter.

In some possible implementations of this disclosure, the wavelength-division multiplexing device may be provided with a plurality of fasteners, to meet a requirement for converging or separating light rays with a plurality of wavelengths.

In this disclosure, the fastener may be an integral structure. To reduce impact of a material of the fastener on light absorption and on a transmission route, in a possible implementation of this disclosure, the fastener may be made of a material whose optical transmittance is greater than 80% for a wave band greater than or equal to 1250 nanometers but less than or equal to 1350 nanometers.

In addition, to improve structural stability of the wavelength-division multiplexing device, the wavelength-division multiplexing device may be further provided with a mounting housing. The fastener, the optical fiber, the filter, and the like may be accommodated in a cavity of the mounting housing. An optical fiber mounting hole may be disposed on a housing body of the mounting housing. The optical fiber may extend through the optical fiber mounting hole to the outside of the mounting housing, to connect to another device.

The mounting housing provided in this disclosure may be a closed housing body structure. A sealing structure may be disposed between the optical fiber and a wall of the optical fiber mounting hole, and the optical fiber is fastened to the mounting housing by using the sealing structure. In this way, an effect of sealing between the optical fiber and the optical fiber mounting hole may be effectively improved, thereby preventing liquid or dust from entering the cavity of the mounting housing, and protecting structures such as the optical fiber and the filter mounted in the cavity of the mounting housing.

According to a second aspect, a communications device is provided. The communications device may include a light source, a detector, and the wavelength-division multiplexing device according to the first aspect. The wavelength-division multiplexing device may serve as a multiplexer or a demultiplexer. The wavelength-division multiplexing device serving as a multiplexer may be configured to converge light rays with different wavelengths emitted by a light source at an emitting end, so that a plurality of light rays of different signals can be conveyed on one optical fiber. The wavelength-division multiplexing device serving as a demultiplexer may be used at a receive end to separate light rays with different wavelengths. The detector may be configured to restore signals modulated into the light rays. Because a structure of the wavelength-division multiplexing device in the communications device provided in this disclosure is simplified, assembly efficiency of the wavelength-division multiplexing device is improved. In this way, production efficiency of the communications device is significantly improved, thereby reducing a production cost of the communications device.

BRIEF DESCRIPTION OF DRAWINGS

FIG. 1*a* is a schematic diagram of a structure of a three-port device;

FIG. 1*b* is a schematic diagram of a structure of a wavelength-division multiplexer in a three-port cascading solution;

FIG. 2*a* is a schematic diagram of a structure of an optical fiber collimator;

DESCRIPTION OF EMBODIMENTS

Figure 2B:
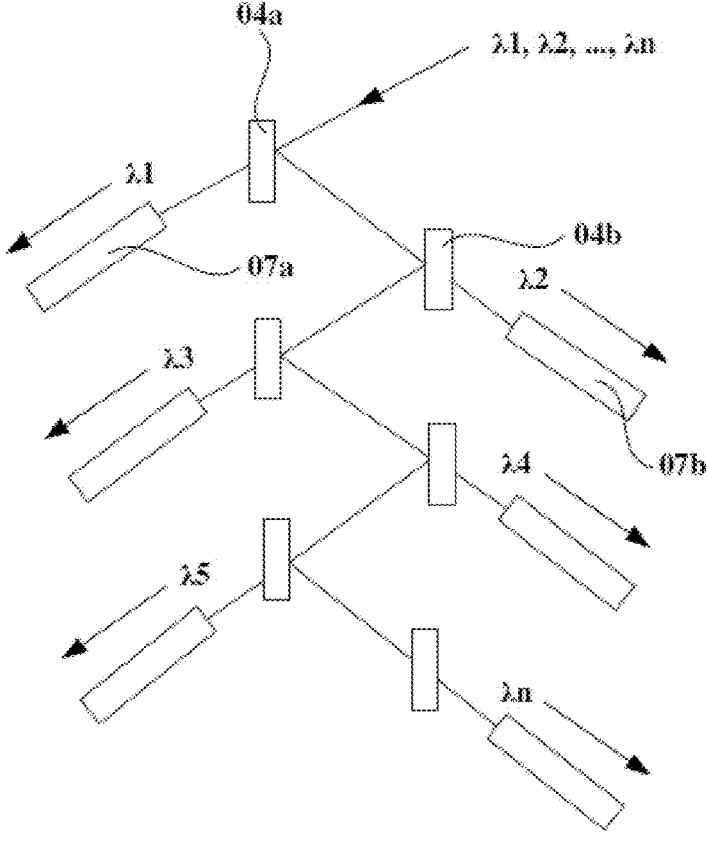
FIG. 2*b* is a schematic diagram of a structure of a wavelength-division multiplexer using a compact wavelength-division multiplexing solution.

To make the objectives, technical solutions, and advantages of this disclosure clearer, the following further describes this disclosure in detail with reference to the accompanying drawings. It needs to be noted that in the description of this disclosure, "at least one" means one or more, and a plurality of means two or more. In this case, in embodiments of the present invention, "a plurality of" may also be understood as "at least two". The term "and/or" describes an association relationship between associated objects and indicates that three relationships may exist. For example, A and/or B may indicate the following cases: Only A exists, both A and B exist, and only B exists. In addition, the character "/" usually indicates an "or" relationship between the associated objects unless otherwise specified. In addition, it needs to be understood that, in the description of this disclosure, terms such as "first" and "second" are merely used for distinguishing between descriptions, and cannot be understood as an indication or implication of relative importance, or understood as an indication or implication of an order.

Reference to "an embodiment", "some embodiments", or the like described in this specification indicates that one or more embodiments of this disclosure include a specific feature, structure, or characteristic described with reference to the embodiment or embodiments. Therefore, statements, such as "in an embodiment", "in some embodiments", "in some other embodiments", and "in some additional embodiments", which appear at different places in this specification, do not necessarily mean reference to a same embodiment, but mean "one or more but not all of embodiments", unless otherwise specifically emphasized. The terms "include", "comprise", "have", and their variants all mean "include but is not limited to", unless otherwise specifically emphasized.

For ease of understanding a wavelength-division multiplexing device provided in embodiments of this disclosure, the wavelength-division multiplexing technology is first described. The wavelength-division multiplexing technology is a communications technology through which a series of light rays carrying information but having different wavelengths are combined into one beam by using a multiplexer at a transmit end, and conveyed along a single optical fiber, and then the light beam is divided into the light rays having different wavelengths by using a demultiplexer at a receive end. This technology can perform simultaneous transmission of a plurality of channels of signals on one optical fiber, where each channel of signals is conveyed by a light ray with a specific wavelength, which is called a wavelength channel.

In a wavelength-division multiplexer, a basic element configured to implement functions of the wavelength-division multiplexer is an optical filter. Optical filters may be classified into an optical fiber fused taper type, a thin-film filter type, an arrayed waveguide grating type, and the like. The thin-film filter type and the arrayed waveguide grating type are two common types of optical filters currently used. In this disclosure, a wavelength-division multiplexing device using an optical filter of a thin-film filter type is mainly described. A specific manner of disposing a wavelength-division multiplexing device using another type of optical filters is similar. Details are not described herein.

A thin-film filter is made by using a method for plating a plurality of dielectric film layers on a glass substrate G. An expression of the film layers is: $G(HL)^P (LH)^P A$, where H is a film layer that has a high refractive index and an optical thickness of one fourth a wavelength, L is a film layer that has a low refractive index and an optical thickness of one fourth a wavelength, and A represents air, P represents a quantity of film layers, P=1, 2, . . . , n, and n is a positive integer. In addition, when the optical thicknesses of the film layers are one fourth a wavelength, an effect of transmissively transmitting or reflecting a light ray with the wavelength can be effectively improved. However, when the optical thicknesses of the film layers are half a wavelength, the film layer does not affect a light ray with the wavelength, and the light ray can completely pass through the film layer. A thin-film filter can transmissively transmit a light ray with a specified wavelength by plating dielectric film layers of different optical thicknesses, and reflects light rays with other wavelengths, thereby implementing wavelength-division multiplexing and demultiplexing functions.

Currently, a three-port cascading solution and a compact wavelength-division multiplexing solution are commonly used for a wavelength-division multiplexer based on thin-film filters. A wavelength-division multiplexer using the three-port cascading solution includes a plurality of three-port devices. Refer to FIG. 1a. FIG. 1a shows a schematic diagram of a structure of a three-port device. The three-port device may include a dual-fiber dual-hole pigtail 01, a single-fiber single-hole pigtail 02, two lenses 03, a filter 04, two glass tubes 05, and a metal tube 06. The filter 04 is pasted on an end surface that is of the lens 03 and that corresponds to the dual-fiber dual-hole pigtail 01. Since the three-port device is a common device currently used in this field, a specific structure of the three-port device is not described herein.

FIG. 1b is a wavelength-division multiplexer formed by cascading the three-port devices shown in FIG. 1a. With reference to FIG. 1a and FIG. 1b, by using the wavelength-division multiplexer, a series of light rays whose wavelengths are λ1, λ2, . . . , and λn may be input from a common end. In addition, film layers of the filter 04 are properly designed, so that a light ray whose wavelength is λ1 can be transmissively transmitted, and light rays with other wavelengths are reflected. Therefore, the light ray whose wavelength is λ1 is output from a transmissive end of the three-port device, and the light rays with other wavelengths are output from a reflective end. Therefore, it may be understood that, by cascading a plurality of three-port devices, light rays with different wavelengths may be separated from each other.

In addition, a wavelength-division multiplexer using the compact wavelength-division multiplexing solution may include a plurality of optical fiber collimators 07 and filters. Refer to FIG. 2a. FIG. 2a shows a structure of a single optical fiber collimator 07. The single optical fiber collimator 07 may include a single-fiber single-hole pigtail 02, a lens 03, a glass tube 05, and a metal tube 06. Since the optical fiber collimator 07 is a common device currently used in this field, a specific structure of the optical fiber collimator 07 is not described herein.

FIG. 2b is a schematic diagram of a structure of a wavelength-division multiplexer formed by using the optical fiber collimators 07 in FIG. 2a. With reference to FIG. 2a and FIG. 2b, by using the wavelength-division multiplexer, light rays whose wavelengths are λ1, λ2, . . . , and λn respectively may be input from a common end, and focus on a filter 04a disposed in one-to-one correspondence with a first optical fiber collimator 07a. In this way, by properly designing film layers of the filter 04a, a light ray whose wavelength is λ1 may be transmissively transmitted through the filter 04a, and the light ray whose wavelength is λ1 is coupled into a single-fiber single-hole pigtail 02 (refer to FIG. 2a) of the first optical fiber collimator 07a through a lens 03 (refer to FIG. 2a) of the first optical fiber collimator 07a, so that the light ray whose wavelength is λ1 is separated. Light rays with remaining wavelengths are reflected by the filter 04a to a filter 04b disposed in a correspondence with a second optical fiber collimator 07b where the light rays are separated. This goes on until all the light rays are separated. It may be learned from FIG. 2b that, in this embodiment, coupling between wavelength channels may be implemented in a form of a collimated light ray along a "Z" line.

It may be learned, from the foregoing description of the three-port device cascading solution and the compact wavelength-division multiplexing solution, that wavelength-division multiplexers using the two solutions each require a relatively large quantity of elements and each have a relatively complex structure. In addition, in both the three-port device cascading solution and the compact wavelength-division multiplexing solution, active adjustment and assembly need to be performed between a pigtail and a lens, and between pigtails; and an assembly process is relatively complex.

A wavelength-division multiplexing device provided in embodiments of this disclosure is intended to resolve the foregoing problems, to simplify the structures of the foregoing wavelength-division multiplexers, and improve assembly efficiency of the foregoing wavelength-division multiplexers. In addition, the wavelength-division multiplexing device provided in embodiments of this disclosure may be applied to various communications devices. For example, the wavelength-division multiplexing device may be applied to a switch, a router, or the like, to implement a communications function of a communications device.

Figure 3:
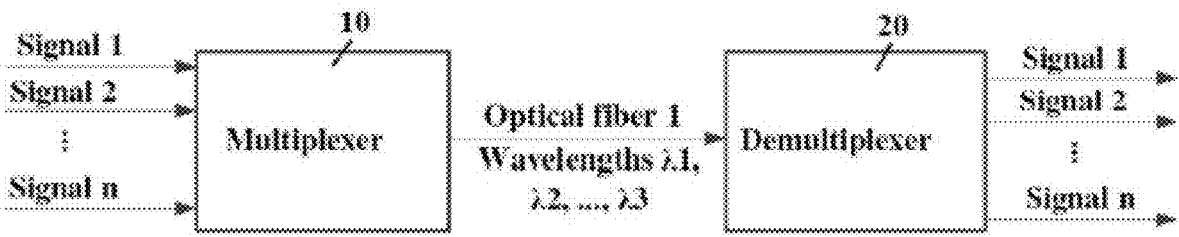
FIG. 3 is a schematic diagram of an application scenario of a wavelength-division multiplexing device according to an embodiment of this disclosure.

Refer to FIG. 3. FIG. 3 shows an application scenario in which a wavelength-division multiplexing device provided in this embodiment of this disclosure is applied to the optical communications field. At a transmit end, n signals are modulated into light rays whose wavelengths are respectively λ1, λ2, . . . , and λn and then conveyed on a same optical fiber 1 by using a multiplexer 10. At a receive end, a demultiplexer 20 is used to separate the light rays with different wavelengths from an optical fiber 1, to restore the n initial signals.

It needs to be noted that, because an optical path is reversible, that is, when a light ray is incident to a medium interface in a direction opposite to an original direction in which the light ray is reflected (or refracted), the light ray is definitely emitted in a direction opposite to an original incident direction. On this basis, the wavelength-division multiplexing device provided in this disclosure may be used as a multiplexer 10, and may also be used as a demultiplexer 20. The following describes in detail, with reference to the accompanying drawings, a specific disposition manner of the wavelength-division multiplexing device provided in this disclosure.

Figure 4:
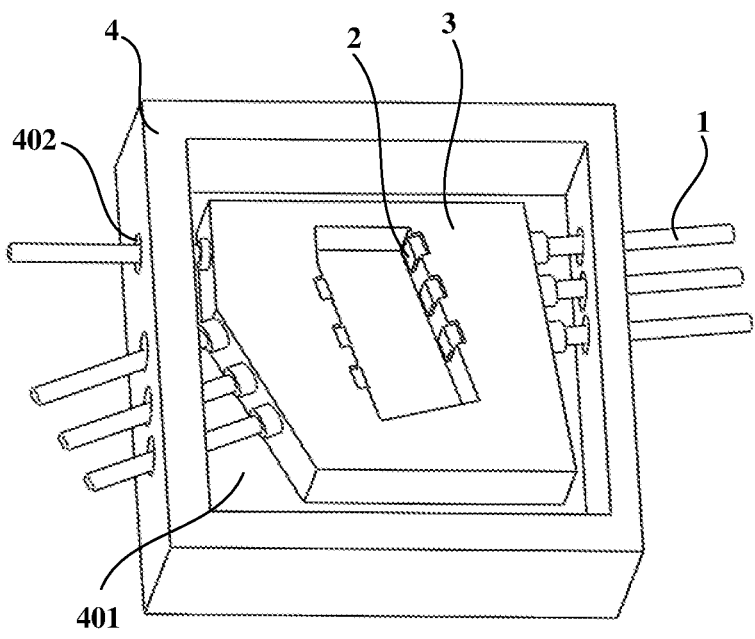
FIG. 4 is a schematic diagram of a structure of a wavelength-division multiplexing device according to an embodiment of this disclosure.

Refer to FIG. 4. FIG. 4 is a schematic diagram of a structure of a wavelength-division multiplexing device according to an embodiment of this disclosure. The wavelength-division multiplexing device may include an optical fiber 1, a filter 2, and a fastener 3. The optical fiber 1 and the filter 2 may be mounted on the fastener 3, so that the fastener 3 can support the optical fiber 1 and the filter 2.

Refer to FIG. 4 again. The wavelength-division multiplexing device may further include a mounting housing 4, where a material of the mounting housing 4 may be plastic, to reduce a cost of the wavelength-division multiplexing device. In some possible embodiments, the material of the mounting housing 4 may also be metal, to effectively improve structural stability of the wavelength-division multiplexing device.

In this disclosure, the mounting housing 4 may be of a cavity structure, and the fastener 3 may be accommodated in a cavity 401 of the mounting housing 4, so that the mounting housing 4 can support the fastener 3, and can protect the fastener 3 and elements such as the optical fiber 1 and the filter 2 that are mounted on the fastener 3. In addition, an optical fiber mounting hole 402 may be disposed on a housing body of the mounting housing 4, and the optical fiber 1 may pass through the optical fiber mounting hole 402 to implement installation with the fastener 3. A sealing structure (not shown in FIG. 4) may be further disposed between the optical fiber 1 and a wall of the optical fiber mounting hole 402, and the optical fiber 1 may be fastened to the mounting housing 4 by using the sealing structure. For example, the sealing structure may be formed by dispensing glue, or may be a sealing ring. It may be understood that, in this embodiment of this disclosure, the mounting housing 4 may be disposed in a closed structure. In FIG. 4, to show a mounting relationship between the fastener 3 and the mounting housing 4, a cover plate on one side of the mounting housing 4 is omitted.

Figure 5:
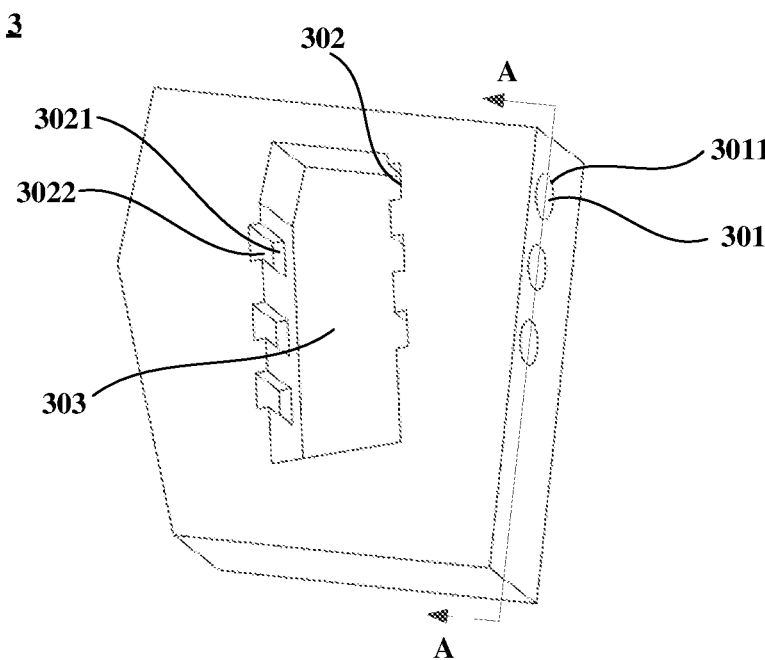
FIG. 5 is a schematic diagram of a structure of a fastener according to an embodiment of this disclosure.

In this disclosure, the fastener 3 is used as a core structure of the wavelength-division multiplexing device. For specific disposition of the fastener 3, refer to FIG. 5. FIG. 5 is a schematic diagram of a structure of the fastener 3 according to a possible embodiment of this disclosure. In this embodiment, the fastener 3 may be of an integral structure, and a material of the fastener 3 may be but is not limited to plastic, so that the fastener 3 may be obtained through processing by using a hot pressing or injection molding process. In addition, the fastener 3 may be made of a material whose optical transmittance is greater than 80% for a wave band greater than or equal to 1250 nanometers but less than or equal to 1350 nanometers.

Refer to FIG. 5 again. An optical fiber positioning hole 301 may be disposed on the fastener 3, where the optical fiber positioning hole 301 may be used to install the optical fiber 1 shown in FIG. 4 and limit an installation position of the optical fiber 1. To facilitate installation of the optical fiber 1, the optical fiber positioning hole 301 may extend from a surface of the fastener 3 to the inside of the fastener 3. In this disclosure, an end part that is of the optical fiber positioning hole 301 and that is located on a surface of the fastener 3 is referred to as an opening 3011 of the optical fiber positioning hole 301, and an end part that is of the optical fiber positioning hole 301 and that extends to an inside of the fastener 3 is referred to as a tail end of the optical fiber positioning hole 301. In addition, in this disclosure, the optical fiber positioning hole 301 may be but is not limited to a regular-shaped hole such as a square hole, a round hole, or a V-shaped hole, or may be disposed as an irregular-shaped hole such as a profile hole, provided that it is convenient to install and position the optical fiber 1.

As shown in FIG. 5, to implement installation of the filter 2 and the fastener 3 shown in FIG. 4, a filter mounting groove 302 may be further disposed on the fastener 3. The filter mounting groove 302 may be a regular-shaped groove such as a rectangular groove, or may be another irregular-shaped groove. The filter mounting groove 302 may be disposed on a side of a tail-end that is of the optical fiber positioning hole 301 and that is away from the opening 3011. There is a spacing between the filter mounting groove 302 and the tail end of the optical fiber positioning hole 301. The spacing may be adjusted based on a volume of the fastener 3 and precision of alignment between the filter mounting groove 302 and the optical fiber positioning hole 301. In a possible embodiment of this disclosure, there may be two groove walls disposed at a specific included angle in the filter mounting groove 302, for example, a groove wall 3021 and a groove wall 3022 in FIG. 5. In this way, when the filter 2 is mounted in the filter mounting groove 302, one end of the filter 2 can abut against the groove wall 3021, and a surface of one side of the filter 2 is mounted on the groove wall 3022, thereby facilitating installation and positioning of the filter 2.

Refer to FIG. 5 again. In a possible embodiment of this disclosure, the fastener 3 may be further disposed as a hollow structure, and the filter mounting groove 302 may be disposed on a side wall of a hollow area 303 of the fastener 3. For example, the filter mounting groove 302 may be disposed on two oppositely-disposed side walls of the hollow area 303. In this way, the hollow area 303 is disposed, so that the filter mounting groove 302 can be conveniently disposed, and a weight of the fastener 3 may be further reduced, thereby saving a material. In some other possible embodiments, after the filter 2 shown in FIG. 4 is installed in the filter mounting groove 302, the hollow area 303 may be filled and blocked, to improve reliability of a connection between the filter 2 installed in the filter mounting groove 302 and the fastener 3.

Figure 6:
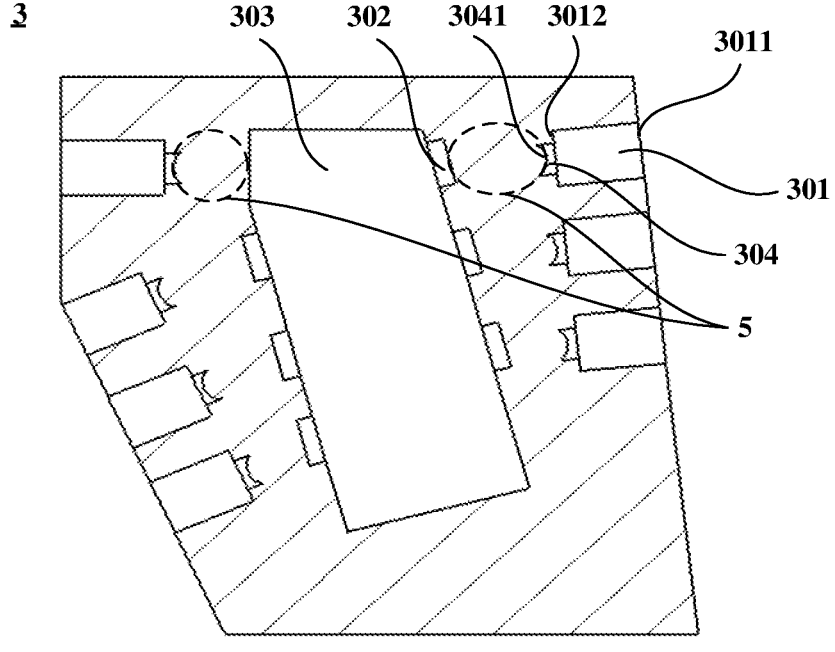
FIG. 6 is a sectional view of A-A in FIG. 5.

Refer to FIG. 6. FIG. 6 is an A-A sectional view of the fastener 3 shown in FIG. 5. A common end and a plurality of transmissive ends may be generally disposed in the wavelength-division multiplexing device. The common end is configured to: input light rays with different wavelengths into the wavelength-division multiplexing device, or emit light rays with different wavelengths from the wavelength-division multiplexing device. The transmissive end is configured to perform transmission of a light ray with a single wavelength. Therefore, in this disclosure, the fastener 3 may be provided with a plurality of optical fiber positioning holes 301. For example, n+1 optical fiber positioning holes 301 may be disposed on the fastener 3, where n is a positive integer. Therefore, one of the optical fiber positioning holes 301 may be configured to install an optical fiber used as the common end, and the other n optical fiber positioning holes 301 are configured to install optical fibers used as the transmissive ends.

In some embodiments of this disclosure, the fastener 3 may be provided with a plurality of filter mounting grooves 302. The filter may be configured to select a light ray. Therefore, one filter mounting groove 302 may be disposed at each optical fiber positioning hole 301 for installing an optical fiber used as a transmissive end, and the filter mounting groove 302 may not be disposed at a position of the optical fiber positioning hole 301 for installing an optical fiber used as the common end. In this embodiment, n filter mounting grooves 302 may be disposed, and a difference between a quantity of optical fiber positioning holes 301 and a quantity of filter mounting grooves 302 is 1.

It may be understood that a specific arrangement manner of the plurality of optical fiber positioning holes 301 and the plurality of filter mounting grooves 302 in the fastener 3 may be determined based on a specific transmission manner of light rays in the filter.

In an embodiment of this disclosure, an installation position of the optical fiber may be adjusted by disposing the optical fiber positioning hole 301. Refer to FIG. 6 again. For the disposition of the optical fiber positioning hole 301, a tilt angle of the optical fiber positioning hole 301 may be considered first. Because an optical fiber installed in the optical fiber positioning hole 301 is used to convey a light ray, the tilt angle of the optical fiber positioning hole 301 may be adjusted based on an arranged position of the filter mounting groove 302. In addition, to limit an insertion depth of the optical fiber in the optical fiber positioning hole 301, in this disclosure, a positioning step 3012 may be disposed at the tail end of the optical fiber positioning hole 301. The optical fiber installed in the optical fiber positioning hole 301 may abut against the positioning step 3012, and a spacing between the positioning step 3012 and the opening 3011 of the optical fiber positioning hole 301 is an available insertion depth of the optical fiber. In this way, the optical fiber mounting hole 402 and the filter mounting groove 302 may be disposed in alignment to implement alignment of positions of the optical fiber positioning holes 301, thereby implementing adjustment of position precision between optical fibers mounted in the optical fiber positioning hole 301.

It may be understood that, in this disclosure, the optical fiber positioning hole 301 and the filter mounting groove 302 may be disposed in alignment, to implement passive adjustment of arrangement position precision of the optical fibers mounted in the optical fiber positioning hole 301 and the filter mounted in the filter mounting groove 302. In this way, an assembly process of the wavelength-division multiplexing device provided in this disclosure can be effectively simplified.

Refer to FIG. 6 again. In a possible embodiment of this disclosure, the wavelength-division multiplexing device may be further provided with a lens 5. The lens 5 may be configured to perform collimation processing on light rays emitted by an optical fiber, or converge collimated light rays and then input the converged light rays into the optical fiber, to reduce a loss of light. Therefore, it may be understood that in this disclosure, the lens 5 may be disposed between the optical fiber and the filter.

Refer to FIG. 6 again. A lens hole 304 may be disposed at the rail end of the optical fiber positioning hole 301. The lens hole 304 is connected to the optical fiber positioning hole 301, and a hole diameter of the lens hole 304 is smaller than a hole diameter of the optical fiber positioning hole 301, to form the positioning step 3012 between the lens hole 304 and the optical fiber positioning hole 301. In addition, an end that is of the lens hole 304 and that is away from the optical fiber positioning hole 301 has an arc-shaped surface 3041. The arc-shaped surface 3041 may be used as a surface of the lens 5. A groove wall of the filter mounting groove 302 on a same optical path may be used as the other surface of the lens. In this way, the lens 5 may be formed between the arc-shaped surface 3041 of the lens hole 304 and the groove wall of the filter mounting groove 302. The lens 5 may be a spherical lens, or may be an aspheric lens. It may be learned that, in this disclosure, the lens 5 and the fastener 3 are an integral structure, which can avoid separate mounting of the lens 5 and the fastener 3, thereby effectively reducing a quantity of elements in the wavelength-division multiplexing device, and simplifying an assembly process of the wavelength-division multiplexing device.

Because the lens 5 is usually disposed as a physical structure, with reference to FIG. 6, in some embodiments of this disclosure, when the fastener 3 is provided with the hollow area 303, the lens 5 needs to be understood as a physical structure between the arc-shaped surface 3041 and the groove wall of the filter mounting groove 302 on the same optical path.

It may be understood that, in this disclosure, the optical fiber positioning hole 301 and the lens hole 304 may be disposed in alignment, to implement passive adjustment and assembly of an optical fiber collimator formed between the optical fibers mounted in the optical fiber positioning hole 301 and the lens 5. In this way, an assembly process of the wavelength-division multiplexing device provided in this disclosure can be effectively simplified.

In some other embodiments of this disclosure, the lens may be separately installed. In this embodiment, the lens may alternatively be installed in a lens mounting hole, and the lens and the optical fiber may be disposed in alignment through active adjustment. The active adjustment between the lens and the optical fiber is a common technical means in this field; therefore, details are not described herein.

It may be understood from the foregoing description of the fastener 3 that, in this disclosure, positions of the optical fiber positioning hole 301, the filter mounting groove 302, and the lens hole 304 are properly designed, so that passive adjustment of position precision between the optical fibers, between the optical fiber and the filter, and between the optical fiber and the lens can be implemented.

Figure 7:
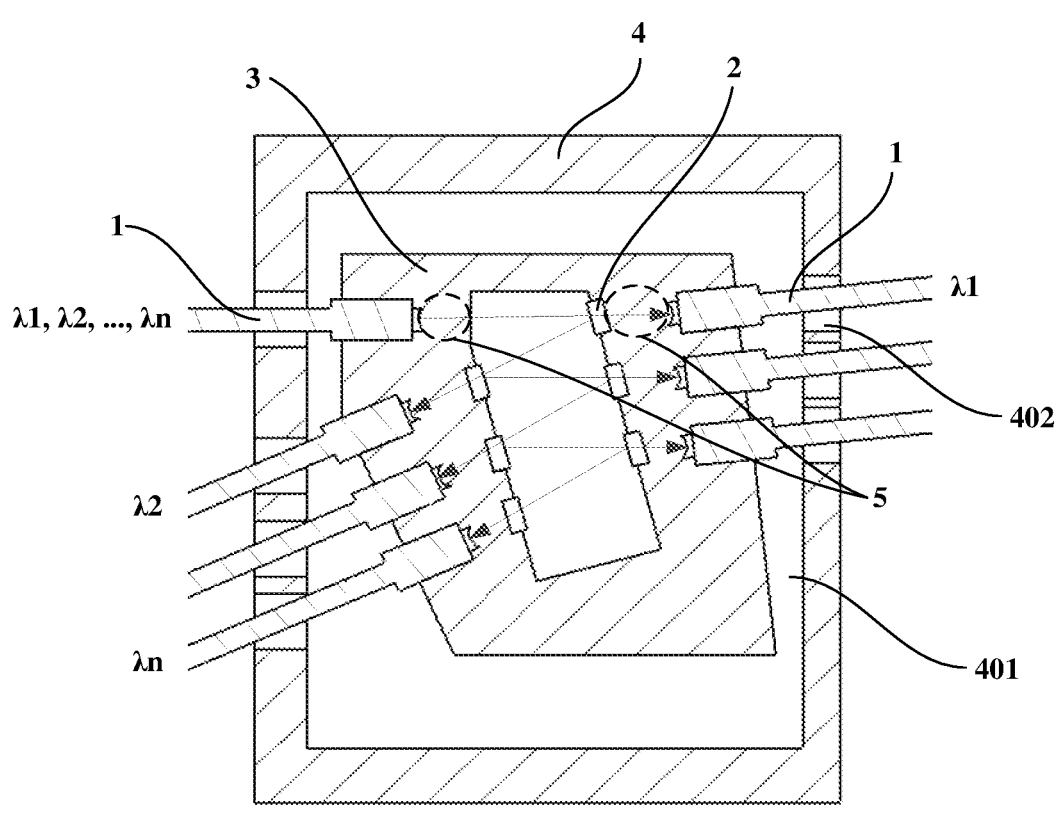
FIG. 7 is a schematic diagram of a cross-sectional structure of a wavelength-division multiplexing device according to an embodiment of this disclosure.

FIG. 7 is a schematic diagram of a cross-sectional structure of a wavelength-division multiplexing device according to an embodiment of this disclosure. Refer to both FIG. 6 and FIG. 7. During specific assembly of the wavelength-division multiplexing device, first, an optical fiber 1 may be installed in each optical fiber positioning hole 301. In specific implementation, the optical fiber 1 may be directly inserted into the optical fiber positioning hole 301 of the fastener 3, and an insertion position of the optical fiber 1 is limited by using the positioning step 3012. In addition, the optical fiber 1 may be fastened onto the fastener 3 in a manner of, but not limited to, dispensing glue between the optical fiber 1 and the wall of the optical fiber positioning hole 301, to implement positioning of the optical fiber 1. Second, a filter is installed in each filter mounting groove 302. In specific implementation, a filter 2 may be disposed in the filter mounting groove 302, and the filter 2 may be attached to the groove wall of the filter mounting groove 302. In addition, the filter 2 and the groove wall of the filter mounting groove 302 may be fastened also by dispensing glue, to implement positioning of the filter 2. Then the fastener 3 assembled with the optical fiber 1 and the filter 2 may be installed in the cavity 401 of the mounting housing 4, and the fastener 3 and the mounting housing 4 may be fastened also by, but not limited to, dispensing glue. Finally, a free end of the optical fiber 1 (where the free end of the optical fiber 1 refers to an end that is of the optical fiber 1 and that extends out of the fastener 3) extends through the optical fiber mounting hole 402 on the mounting housing 4 to the outside of the mounting housing 4. The free end may be communicatively connected to another communications apparatus. In addition, sealing between the optical fiber 1 and the optical fiber mounting hole 402 may be performed also by dispensing glue, so that the mounting housing 4 can perform sealing protection on the wavelength-division multiplexing device, thereby prolonging a service life of the wavelength-division multiplexing device.

It may be understood that the foregoing assembly process of the wavelength-division multiplexing device is merely an example description. In this disclosure, because all elements such as the filter 2 and the optical fiber 1 may be assembled through passive adjustment, no additional alignment operation is required. Therefore, in another possible embodiment of this disclosure, the foregoing installation steps may be adjusted as desired, and the adjustment shall be construed as falling within the protection scope of this disclosure.

For ease of understanding a manner of disposing the wavelength-division multiplexing device provided in this disclosure, the following describes an operating principle of the wavelength-division multiplexing device in this disclosure with reference to FIG. 7. In this embodiment, description is made by using an example in which the optical fiber 1 is a single-fiber single-hole pigtail and the filter 2 is a filter of a thin-film filter type.

In FIG. 7, straight lines with arrows represent transmission directions of light rays. For ease of differentiation, light rays whose wavelengths are $\lambda 1, \lambda 2, \ldots$, and $\lambda n$ respectively enter a first optical fiber that serves as the common end, the light rays input into the first optical fiber are conveyed forward to a first lens and become collimated light, and continue to be conveyed to a first filter. The first filter is coated with a film layer, and the film layer can transmissively transmit the light ray whose wavelength is $\lambda 1$, and can reflect light rays whose wavelengths are $\lambda 2, \lambda 3, \ldots$, and $\lambda n$. In this way, the light ray whose wavelength is $\lambda 1$ is transmissively transmitted forward to a second lens, becomes converged light, and is converged into a second optical fiber for forward transmission.

Then the light rays whose wavelengths are $\lambda 2, \lambda 3, \ldots$, and $\lambda n$ are reflected by the first filter and reach a second filter, where the second filter may be configured to transmissively transmit the light ray whose wavelength is $\lambda 2$ and reflect the light rays whose wavelengths are $\lambda 3, \lambda 4, \ldots$, and $\lambda n$. In this way, after the light rays whose wavelengths are $\lambda 2, \lambda 23, \ldots$, and $\lambda n$ pass through the second filter, the light ray whose wavelength is $\lambda 2$ is transmissively transmitted out and is converged on a third lens, and then reaches a third optical fiber for transmission. The remaining light rays whose wavelengths are $\lambda 3, \lambda 4, \ldots$, and $\lambda n$ continue to be conveyed forward according to a principle similar to the foregoing principle. Finally, the input light rays whose wavelengths are $\lambda 1, \lambda 2, \ldots$, and $\lambda n$ are filtered by n optical filters and then enter n fibers in turn, to complete a demultiplexing function of the wavelength-division multiplexing device. It may be learned from FIG. 7 that, in this embodiment of this disclosure, coupling between wavelength channels may be implemented in a form of a collimated light ray along a "Z" line.

It may be understood that, a multiplexing function of the wavelength-division multiplexing device may follow a principle of reversibility of optical paths, that is, after passing through n optical fibers respectively, the light rays whose wavelengths are s $\lambda 1, \lambda 2, \ldots$, and $\lambda n$ are converged into a light beam and then output by an optical fiber that serves as the common end.

It may be learned, from the description of a wavelength-division multiplexer using the currently common three-port cascading solution, a wavelength-division multiplexer using the compact wavelength-division multiplexing solution, and the wavelength-division multiplexing device solution provided in this disclosure in the foregoing embodiments, that relatively large differences exist between the three forms of wavelength-division multiplexers in terms of a specific disposition manner. A wavelength-division multiplexing device for separating light rays with six wavelengths is used as an example. Quantities of elements and assembly manners of the three forms of wavelength-division multiplexers are listed in Table 1 for comparison.

TABLE 1

| Item for comparison | Material | Three-port cascading solution | Compact wavelength-division multiplexing solution | Solution provided in this application |
|---|---|---|---|---|
| Elements | Dual-fiber dual-hole pigtail | 5 | 0 | 0 |
| | Metal tube | 6 | 7 | 0 |
| | Glass tube | 12 | 7 | 0 |
| | Single-fiber single-hole pigtail | 7 | 7 | 7 |
| | Filter | 6 | 6 | 6 |
| | Lens | 12 | 7 | 0 |
| | Fastener | 0 | 0 | 1 |
| | Total | 48 | 34 | 14 |
| Assembly manner | | 1. Active adjustment is needed when optical fibers and | 1. Active adjustment is needed when optical fibers and lenses are being assembled into | 1. Optical fibers and lenses are assembled into optical fiber |

TABLE 1-continued

| Item for comparison | Material | Three-port cascading solution | Compact wavelength-division multiplexing solution | Solution provided in this application |
|---|---|---|---|---|
| | | lenses are being assembled into optical fiber collimators. 2. Active adjustment is needed between a plurality of optical fiber collimators. | optical fiber collimators. 2. Active adjustment is needed between a plurality of optical fiber collimators. | collimators through passive mounting adjustment. Active adjustment is not needed. 2. Passive mounting is performed for a plurality of optical fiber collimators. Active adjustment is not needed between them. |

It may be learned from the foregoing comparison that, compared with a wavelength-division multiplexer using the three-port cascading solution, the solution of the wave-length-division multiplexing device provided in this disclo-sure cuts down on a quantity of elements from 48 to 14, that is, reduces the quantity of elements by 70%; and compared with a wavelength-division multiplexer using the compact wavelength-division multiplexing solution, the solution of the wavelength-division multiplexing device provided in this disclosure cuts down on a quantity of elements from 34 to 14, that is, reduces the quantity of elements by 60%. It may be understood that, according to the wavelength-divi-sion multiplexing device provided in this disclosure, a quantity of elements of the wavelength-division multiplex-ing device is greatly reduced, so that a structure of the wavelength-division multiplexing device can be effectively simplified, and a cost of the wavelength-division multiplex-ing device can be reduced.

In addition, a wavelength-division multiplexer in the existing three-port cascading solution and a wavelength-division multiplexer in the compact wavelength-division multiplexing solution need to perform active adjustment during installation of optical fibers, a filter, a lens, and an optical fiber collimator, and therefore assembly efficiency of the wavelength-division multiplexers is low, causing low production efficiency of the wavelength-division multiplex-ers. In the wavelength-division multiplexing device pro-vided in this disclosure, after structures such as the optical fiber positioning hole 301, the filter mounting groove 302, and the lens hole 304 are integrated into the fastener 3 shown in FIG. 6, passive mounting of the optical fiber 1 and the filter 2 shown in FIG. 7 can be implemented and the lens 5 does not need to be installed, thereby greatly improving assembly efficiency of the wavelength-division multiplexing device.

In the foregoing embodiments, merely a manner of dis-posing the wavelength-division multiplexing device that separates light rays of a light beam including six wave-lengths is shown. However, it may be understood that, if m optical fibers are disposed in the wavelength-division mul-tiplexing device provided in this disclosure, the wavelength-division multiplexing device may be configured to separate light rays of a light beam including n wavelengths, where n≤m−1.

When light rays of a light beam including more wave-lengths need to be separated, a plurality of fasteners may be further combined for use, where an optical fiber and a filter are mounted on each of the plurality of fasteners. When a plurality of fasteners are combined for use, in two adjacent fasteners, a light ray emitted from one fastener may enter the other fastener through an optical fiber that is disposed on the other fastener and that is used as the common end.

Figure 8:
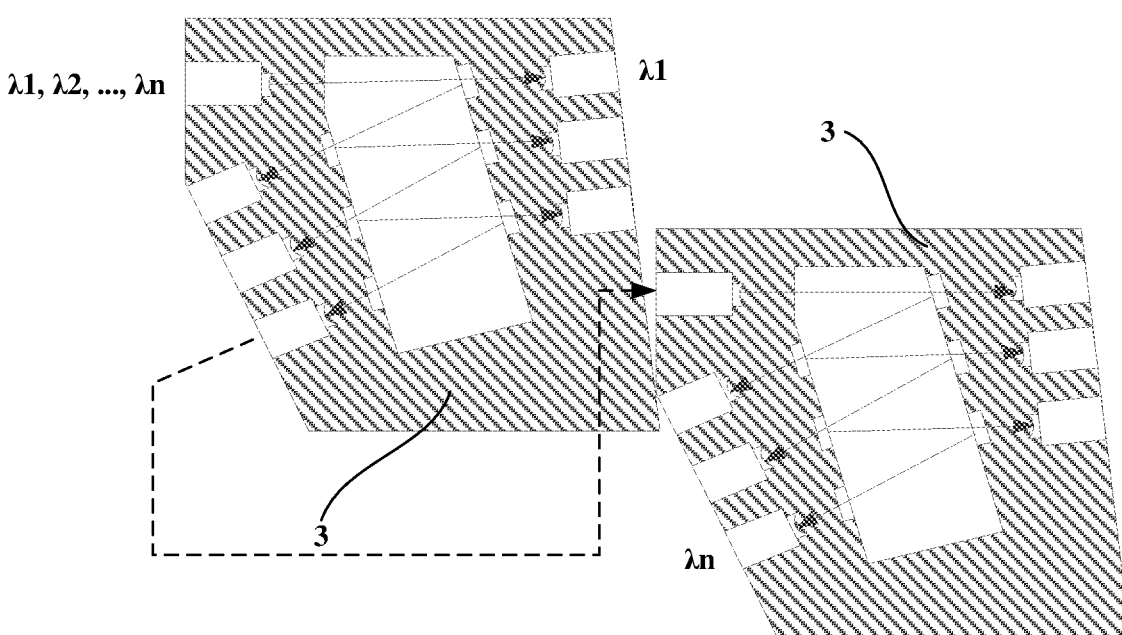
FIG. 8 is a schematic diagram of a composite structure of a wavelength-division multiplexing device according to an embodiment of this disclosure.

For ease of understanding the combined use of a plurality of fasteners, refer to FIG. 8. FIG. 8 is a schematic diagram of a structure of fasteners combined for use in a wavelength-division multiplexing device according to a possible embodiment of this disclosure. In the embodiment shown in FIG. 8, a solid line with an arrow represents transmission of a light ray in a fastener, and a dashed line with an arrow represents transmission of a light ray between fasteners.

A filtering effect of a filter on light rays may be changed, so that light rays with different wavelengths can all trans-missively transmitted through the filter and then enter a same optical fiber. Therefore, in the embodiment shown in FIG. 8, light rays with different wavelengths that cannot be separated by using a previous fastener may enter a next fastener through an optical fiber that serves as a transmissive end, and are then separated. In this case, a transmissive end on a previous fastener may serve as a common end on a next fastener.

It may be understood that, in this embodiment, after two fasteners that can be respectively configured to separate light rays with six wavelengths are combined, the wavelength-division multiplexing device may be configured to separate light rays of a light beam including not more than 12 wavelengths. It needs to be noted that, in the embodiment shown in FIG. 8, for ease of expression, only a combined-arrangement manner of two fasteners 3 is shown. For another structure arrangement of the wavelength-division multiplexing device, reference may be made to any one of the foregoing embodiments, and details are not described herein again.

Figure 9:
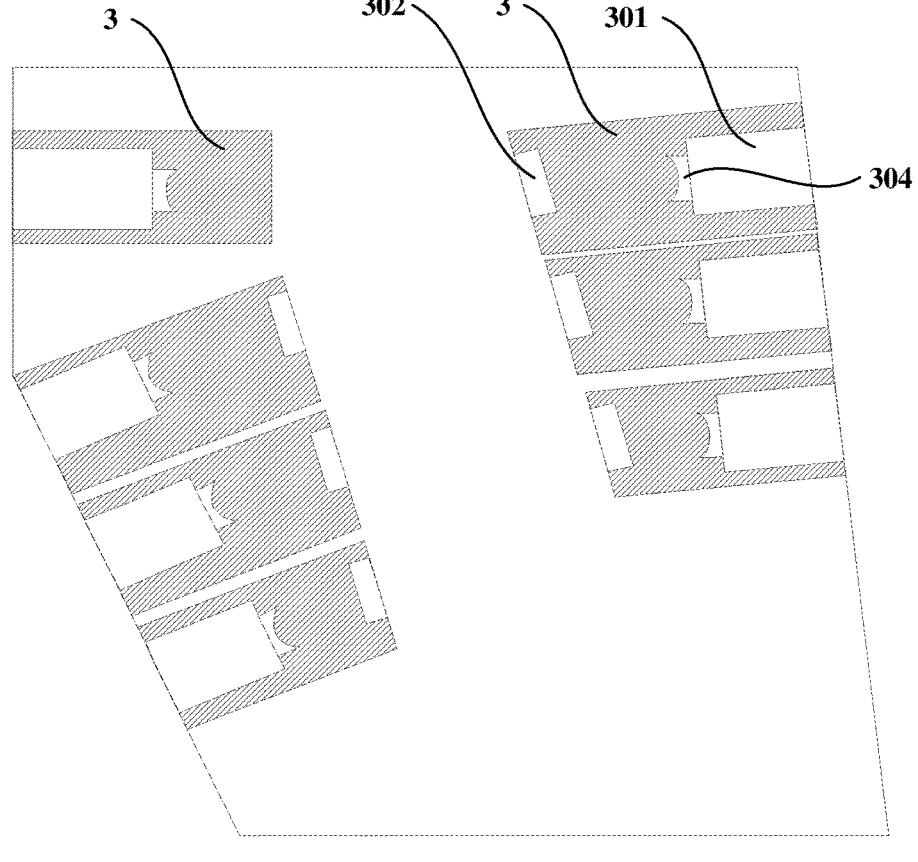
FIG. 9 is a schematic diagram of a structure of a fastener according to another embodiment of this disclosure.

In addition to the foregoing described manner of dispos-ing the wavelength-division multiplexing device, with ref-erence to FIG. 9, FIG. 9 further shows another manner of disposing the wavelength-division multiplexing device according to some possible embodiments of this disclosure. In this embodiment, a plurality of fasteners 3 may also be disposed, and the optical fiber positioning hole 301, the filter mounting groove 302, and the lens hole 304 are disposed on each fastener 3. A specific manner of disposing the fasteners 3 is similar to that in the foregoing embodiments, and details are not described herein again.

A difference lies in that, in the embodiment shown in FIG. 9, only one optical fiber positioning hole 301 and one lens hole 304 are disposed on each fastener 3; and a filter mounting groove 302 may be further disposed on a fastener 3 configured to mount an optical fiber used as a transmissive end. Therefore, a quantity of fasteners 3 may be selected and assembled based on a specific requirement. In this disposition manner, for each fastener 3, passive installation of the optical fiber and the filter can also be implemented and the lens does not need to be installed, thereby simplifying assembly of the wavelength-division multiplexing device.

It may be understood that the foregoing embodiments are merely example descriptions of some possible disposition manners of the wavelength-division multiplexing device provided in this disclosure. On this basis, a person skilled in the art may make a series of variations, which shall be construed as falling within the protection scope of this disclosure.

Figure 10:
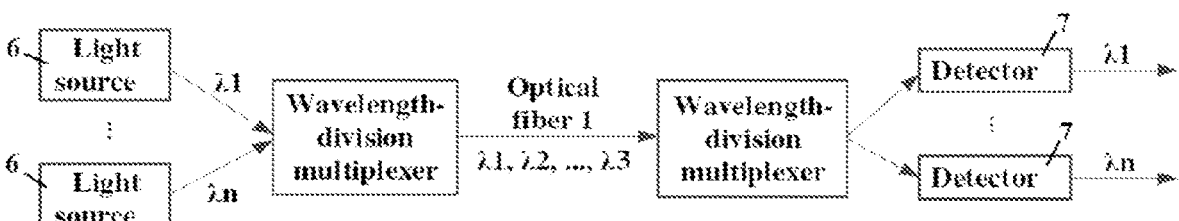
FIG. 10 is a schematic diagram of a structure of a communications device according to an embodiment of this disclosure.

Based on a same inventive concept, this disclosure further provides a communications device. Refer to FIG. 10. FIG. 10 is a schematic diagram of a structure of a communications device according to an embodiment of this disclosure. The communications device may include a light source 6, a detector 7, and the wavelength-division multiplexing device provided in any one of the foregoing embodiments. There may be a plurality of light sources 6, and each light source 6 may be configured to emit a light ray with a specific wavelength. In some possible embodiments, there may be only one light source 6, and the light source 6 may be configured to emit light rays with different wavelengths. In this way, at an emitting end, different signals may be modulated into light rays with different wavelengths for transmission.

It may be learned, from the description of the wavelength-division multiplexing device provided in this disclosure in the foregoing embodiments, that the wavelength-division multiplexing device may serve as a multiplexer or a demultiplexer. At the emitting end, the wavelength-division multiplexing device serving as a multiplexer can converge a plurality of light rays that respectively carry different signals, and enable the light rays to be conveyed on one optical fiber 1. At a receive end, the wavelength-division multiplexing device serving as a demultiplexer can separate the light rays with different wavelengths.

The detector 7 may be configured to convert an optical signal output from the demultiplexer into an electrical signal. One detector 7 may be disposed for each type of light rays with a different wavelength, so that the signals modulated into the light rays with different wavelengths are restored.

Since a structure of the wavelength-division multiplexing device provided in this disclosure is simplified, assembly efficiency of the wavelength-division multiplexing device is improved. In this way, when the wavelength-division multiplexing device is used in a communications device, production efficiency of the communications device may be significantly improved, thereby reducing a production cost of the communications device.

It is clear that a person skilled in the art may make various modifications and variations to this disclosure without departing from the spirit and scope of this disclosure. This disclosure is intended to cover these modifications and variations of this disclosure provided that they fall within the scope of protection defined by the claims of this disclosure and their equivalent technologies.

The invention claimed is:

1. A wavelength-division multiplexing device comprising: a fastener, optical fibers, a filter, and a lens, wherein:
the fastener is provided with an optical fiber positioning hole and a filter mounting groove, the filter mounting groove is disposed on a side of a tail end of the optical fiber positioning hole and that is away from an opening of the optical fiber positioning hole, and the filter mounting groove and the tail end of the optical fiber positioning hole are spaced apart;
an optical fiber of the optical fibers is installed in the optical fiber positioning hole, the filter is installed in the filter mounting groove, and the filter is configured to transmit or reflect light rays emitted by the optical fiber;
the lens is disposed between the optical fiber and the filter, and the lens is configured to:
perform collimation processing on light rays emitted by the optical fiber, or
converge collimated light rays and then input the converged light rays into the optical fiber; and
a positioning step is disposed at the tail end of the optical fiber positioning hole, and the optical fiber is configured to abut against the positioning step.

2. The wavelength-division multiplexing device according to claim 1, wherein the fastener is further provided with a lens hole connected to the optical fiber positioning hole, the lens hole is disposed at the tail end of the optical fiber positioning hole, and the positioning step is formed between the lens hole and the optical fiber positioning hole.

3. The wavelength-division multiplexing device according to claim 2, wherein an end of the lens hole and that is away from the optical fiber positioning hole has an arc-shaped surface; and on a same optical path, the lens is formed between the arc-shaped surface and a groove wall of the filter mounting groove.

4. The wavelength-division multiplexing device according to claim 3, wherein the lens is a spherical lens.

5. The wavelength-division multiplexing device according to claim 3, wherein the lens is an aspheric lens.

6. The wavelength-division multiplexing device according to claim 2, wherein a hole diameter of the lens hole is smaller than a hole diameter of the optical fiber positioning hole to form the positioning step.

7. The wavelength-division multiplexing device according to claim 1, wherein the wavelength-division multiplexing device further comprises at least another filter such that the wavelength-division multiplexing device comprises a plurality of filters, the fastener is provided with at least another optical fiber positioning hole and at least another filter mounting groove such that the fastener is provided with a plurality of optical fiber positioning holes and a plurality of filter mounting grooves, and a difference between a quantity of the plurality of optical fiber positioning holes and a quantity of the plurality of filter mounting grooves is 1; and
one optical fiber of the optical fibers is installed in each of the plurality of optical fiber positioning holes, and one filter of the plurality of filters is installed in each of the plurality of filter mounting grooves.

8. The wavelength-division multiplexing device according to claim 7, wherein the fastener includes a hollow area, and the plurality of filter mounting grooves are separately disposed on two opposite side walls of the hollow area.

9. The wavelength-division multiplexing device according to claim 8, wherein one optical fiber of the optical fibers on the fastener is configured to serve as a common end of the wavelength-division multiplexing device, and another optical fiber of the optical fibers is configured to serve as a transmissive end of the wavelength-division multiplexing device; the common end is configured to:
input light rays with different wavelengths into the wavelength-division multiplexing device, or emit light rays with different wavelengths from the wavelength-division multiplexing device; and the transmissive end is configured to convey a light ray with a single wavelength.

10. The wavelength-division multiplexing device according to claim 9, wherein the plurality of filters are disposed in a one-to-one correspondence with a plurality of transmissive ends of the wavelength-division multiplexing device.

11. The wavelength-division multiplexing device according to claim 10, wherein the wavelength-division multiplexing device further comprises at least another fastener such that the wavelength-division multiplexing device comprises a plurality of fasteners; and for two adjacent fasteners of the plurality of fasteners, a light ray emitted from one fastener of the plurality of fasteners may enter the other fastener of the plurality of fasteners through the common end on the other fastener.

12. The wavelength-division multiplexing device according to claim 1, wherein the fastener is made of a material whose optical transmittance is greater than 80% for a wave band greater than or equal to 1250 nanometers but less than or equal to 1350 nanometers.

13. The wavelength-division multiplexing device according to claim 1, wherein the fastener forms an integral structure.

14. The wavelength-division multiplexing device according to claim 1, wherein the wavelength-division multiplexing device further comprises a housing, and the fastener, the optical fiber, and the filter are accommodated in a cavity of the housing; and a body of the housing is provided with an optical fiber mounting hole, and the optical fiber extends through the optical fiber mounting hole to the outside of the housing.

15. The wavelength-division multiplexing device according to claim 14, wherein a sealing structure is disposed between the optical fiber and a wall of the optical fiber mounting hole, and the optical fiber is fastened onto the housing via the sealing structure.

16. A communications device, comprising a light source, a detector, and the wavelength-division multiplexing device according to claim 1, wherein the wavelength-division multiplexing device is configured to converge or separate light rays with different wavelengths that are emitted by the light source, and the detector is configured to restore signals modulated into the light rays.

17. The wavelength-division multiplexing device according to claim 1, wherein the wavelength-division multiplexing device is configured as a multiplexer to converge the light rays with different wavelengths received from a light source so that the light rays having the different wavelengths can be conveyed into the optical fiber.

18. The wavelength-division multiplexing device according to claim 1, wherein the wavelength-division multiplexing device is configured as a demultiplexer to separate the light rays, the light rays having different wavelengths.

* * * * *